United States Patent [19]

Levy

[11] Patent Number: 5,046,543

[45] Date of Patent: Sep. 10, 1991

[54] MOTOR VEHICLE SUNSHIELD AND POSTER SYSTEMS

[76] Inventor: Abraham Levy, P.O. Box 17212, Tel Aviv, Israel, 61171

[21] Appl. No.: 236,599

[22] Filed: Aug. 25, 1988

[51] Int. Cl.$^5$ .............................................. B60J 3/00
[52] U.S. Cl. ................................ 160/84.1; 160/370.2; 296/97.7
[58] Field of Search .................... 160/84.1, 370.2, 405; 229/52 B; 296/97.7, 97.8

[56] References Cited

U.S. PATENT DOCUMENTS

| D. 293,428 | 12/1987 | Watts . | |
|---|---|---|---|
| D. 294,819 | 3/1988 | Kuri . | |
| 1,018,498 | 2/1912 | Ilse . | |
| 1,252,766 | 1/1918 | Anderson . | |
| 1,307,437 | 6/1919 | Curry . | |
| 1,421,716 | 7/1922 | Randall . | |
| 1,944,696 | 1/1934 | Reichl . | |
| 1,987,259 | 1/1935 | Koehler . | |
| 2,305,677 | 12/1942 | Cotton . | |
| 2,546,438 | 3/1951 | Grabill . | |
| 2,560,762 | 7/1951 | Ghegan . | |
| 2,599,014 | 6/1952 | Pritchard . | |
| 2,651,543 | 9/1953 | Chonoski et al. . | |
| 2,703,197 | 3/1955 | Brasch | 229/52 B |
| 2,715,042 | 8/1955 | Lancaster . | |
| 2,718,301 | 9/1955 | Palmer | 229/52 B X |
| 2,804,135 | 8/1957 | Sutton . | |
| 2,806,809 | 9/1957 | Schuh . | |
| 2,855,241 | 10/1958 | Walter . | |
| 3,003,812 | 10/1961 | Haugland . | |
| 3,018,100 | 1/1962 | Joseph | 272/8 R X |
| 3,151,662 | 10/1964 | Fait : | |
| 3,192,784 | 7/1965 | Cayton . | |
| 3,464,619 | 9/1969 | Nordstrom | 229/52 B |
| 3,627,272 | 12/1971 | Friedberg . | |
| 3,690,080 | 9/1972 | Dillard . | |
| 3,880,461 | 4/1975 | Flanagan . | |
| 4,005,899 | 2/1977 | Rigney . | |
| 4,202,396 | 5/1980 | Levy . | |
| 4,399,347 | 8/1983 | Schmitt . | |
| 4,472,915 | 9/1984 | Smith . | |
| 4,636,179 | 1/1987 | Gentile et al. . | |
| 4,647,102 | 3/1987 | Ebrahimzadeh . | |
| 4,652,039 | 3/1987 | Richards . | |
| 4,671,334 | 6/1987 | Yadegar et al. . | |
| 4,671,558 | 6/1987 | Cline . | |
| 4,708,388 | 11/1987 | Zacharczuk | 296/97.7 |
| 4,727,920 | 3/1988 | Siegler . | |
| 4,751,115 | 6/1988 | Smith et al. . | |
| 4,762,358 | 8/1988 | Levosky et al. . | |
| 4,763,947 | 8/1988 | Gregg | 160/84.1 |
| 4,777,994 | 10/1988 | Nederveld | 296/97.7 X |
| 4,784,215 | 11/1988 | Sing . | |

FOREIGN PATENT DOCUMENTS 1088422  9/1960  Fed. Rep. of Germany .

OTHER PUBLICATIONS

Quill, Advertising leaflet for Bankers Box.
Popular Science, May 1953, p. 181.
"Folding Car Shades Are a Red-Hot Item in Sun Belt," Los Angeles Times Business Section, Monday, Sep. 8, 1986.
The Package Engineering Handbook by Walter Stern (Board Products Publishing Co.), vol. 41, pp. 95, 351 (Jul. 1968).
Copy of section of cardboard box with load carrying handle.

Primary Examiner—David M. Purol
Attorney, Agent, or Firm—Benoit Law Corporation

[57] ABSTRACT

In making a sunshield for shading a motor vehicle inside a window thereof, a substantial portion of the sunshield is provided with a poster-like message publicly displayable through that window and also publicly displayable outdoors or otherwise apart from the motor vehicle, by a person holding that sunshield up in the air. The sunshield is made foldable accordion style, and is made manually stretchable by a person for a public display of the message outdoors by providing that sunshield with lateral handles with which the sunshield may be engaged and held up, such as by several fingers of each hand of that person.

22 Claims, 2 Drawing Sheets

MOTOR VEHICLE SUNSHIELD AND POSTER SYSTEMS

BACKGROUND OF THE INVENTION

1. Field of the Invention

The subject invention relates to sunshields, to methods for making sunshields or shades for protecting the interior of motor vehicles against sun rays and blaze, particularly during outdoor parking, and to combined sunshield and poster systems.

2. Information Disclosure Statement

The following disclosure statement is made pursuant to the duty of disclosure imposed by law and formulated in 37 CFR 1.56(a). No representation is hereby made that information thus disclosed in fact constitutes prior art, inasmuch as 37 CFR 1.56(a) relies on a materiality concept which depends on uncertain and inevitably subjective elements of substantial likelihood and reasonableness and inasmuch as a growing attitude appears to require citation of material which might lead to a discovery of pertinent material though not necessarily being of itself pertinent. Also, the following comments contain conclusions and observations which have only been drawn or become apparent after conception of the subject invention or which contrast the subject invention or its merits against the background of developments which may be subsequent in time or priority.

Also, no preamble of any statement of invention or claim hereof is intended to represent that the content of that preamble is prior art, particularly where one or more recitatons in a preamble serve the purpose or providing antecedents for the remainder of a statement of invention or claim.

Also, no sequential recitation or listing in any claim, summary of the invention or other part hereof is intended as a limitation to the provision of any recited means or provision or performance of any recited steps or features in that or any other particular sequence, unless the claimed sequence is the or an essential feature of a claimed combination over the prior art.

As may be seen from page 181 of the May 1953 issue of POPULAR SCIENCE, attempts to "keep your car from heating like a greenhouse when you must park in direct sunlight," go back for many years. In particular, it was then suggested to cut white cardboard shades for all windows, making each shade ⅛" too wide or big, the idea being, "Spring them in place and they will stay put." Major problems of that proposal included the considerable skill and manual dexterity actually required for making and installing such cardboard shades as specified, and the fact that the combination of that teaching in effect resulted in a glass/cardboard laminate through which heat from the sun could transfer from the outside to the inside of the car without any substantial intervening air layer or circulation.

The same probably applied to the windshield heat reflector disclosed in U.S. Pat. No. 3,880,461 by George Paul Flanagan, issued Apr. 29, 1975.

None of these proposals ever found any significant public use, not even after millions of my motor vehicle sunshields have been sold by my CARCOOL Company and by several licensees, as mentioned, for instance, in the article "Folding Car Shades Are a Red-Hot Item in Sun Belt," published Monday, Sept. 8, 1986 in the Business section of the Los Angeles Times. As therein confirmed, I am holding the patent rights for that kind of sunshield, as apparent from my U.S. Pat. No. 4,202,396, issued May 13, 1980.

Even though more than thirty million of my sunshields have now been sold, their operation and effect still cannot satisfactorily be explained by the state of the art of scientific technology. In an age where exponents of scientific knowledge carried the greenhouse effect into outer space to explain the workings of the universe, my sunshield simply defies the greenhouse effect which, in so many words, insists that "Once the heat is in (e.g. through the windshield and in the air space between the windshield and my unfolded sunshield), it has lost energy and cannot go back out where it came from." Yet, the fact observable on any sunny day is that my sunshield not only prevents sun damage to dashboards and car interiors, but also keeps the inside of cars measurably cooler during hot days.

In a development related to my efforts. U.S. Pat. No. 4,652,039 by Roger H. Richards, issued Mar. 24, 1987 to one of my permitees, discloses perforated circular thumb holes near each side of the shade; commenting that the thumb holes can be punched out, so that the shade may be more easily handled. However, that prior-art approach neither has become popular, nor are mere thumb holes of particular benefit.

In a completely unrelated development, people have become increasingly fond of expressing their feelings and preferences, or of attracting attention or promoting some cause, by holding up placards and posters presenting a message or statement. In today's mass society, people are anxious to identify themselves with all kind of worthy causes, teams, candidates, etc. This even has taken the form of organized activities during which a multitude of persons, such as spectators at a sporting event, hold up placards or posters with both hands, sometimes in an orchestrated manner for specific effect.

However, prior to my subject invention, these developments proceeded in an unrelated manner, which was understandable from the point of view of their different goals.

In an unrelated development, U.S. Pat. No. 3,627,272, by S. Friedberg, issued Dec. 14, 1971, disclosed a protective enclosure unit which is constructed in terms of suntanning and would be too bulky for efficient use in motor vehicles, even though adjacent to each upper panel ridge or edge there was formed in the respective panel an elongate slot or through opening. When collapsing the unit to a storage position, these openings were swung into alignment or registry to permit insertion therebrough of a person's hand for conveniently carrying the collapsed unit.

In a different vein, cardboard boxes have for years been provided with load carrying handles formed by bending a piece of the cardboard out of an elongate opening in the side of the box.

SUMMARY OF THE INVENTION

It is a general object of this invention to provide novel sunshield and poster combinations.

It is a germane object of the invention to provide combined foldable sunshields for shading motor vehicles inside of windows thereof and stretchable posters for publicly displaying messages through a motor vehicle window and outdoors as well.

It is a related object of this invention to enhance the value of sunshields for shading motor vehicles as posters for displaying messages.

It is also an object of this invention to enhance the attractiveness of such sunshields.

It is a further object of this invention to broaden the utility of such sunshields without impairment of their quality for any one use thereof.

It is a related object of this invention to provide new functional relationships and utility through combination of printed matter with physical structure.

It is a further object of this invention to encourage expressions of free speech protected under the First Amendment of the United States Constitution.

It is also an object of the invention to provide people with convenient and more effective means to summon off-road emergency assistance.

It is a related object of this invention to provide people in off-the-road vehicles with an effective means to summon emergency assistance with a large moving object; namely a sunshield which they can stretch out and hold up into the air and wave up and down and from side to side to attract attention.

Other objects of this invention will become apparent in the further course of this disclosure.

From one aspect thereof, the subject invention resides in a method of making a sunshield for shading a motor vehicle inside a window thereof, and, more specifically, resides in the improvement comprising, in combination, the steps of providing a substantial portion of the sunshield with a poster-like message publicly displayable through the motor vehicle window and also publicly displayable apart from any motor vehicle by a person holding up said sunshield, making that sunshield foldable accordion style, and making the sunshield stretchable by a person for a public display of its message apart from any motor vehicle by providing the sunshield with lateral handles for manual engagement by several fingers of each hand of that person, the handles being provided by forming in the sunshield adjacent each of two lateral edges thereof an opening of sufficient size to accommodate several fingers, leaving imperforate parts of the sunshield in the elongate openings, and being such imperforate parts out of the openings without diminution in size toward the next-adjacent one of the two lateral edges at each opening.

From a related aspect thereof, the subject invention resides in an article of manufacture constituting both a hand-held poster and a specific sunshield for shading a motor vehicle inside a window thereof, comprising, in combination, a sunshield of a shading material folded accordion style and expandable to correspond in shape to the motor vehicle window and having lateral handles each dimensioned for manual engagement by several fingers of a person's hand, each of the handles having an opening of sufficient size to accommodate the fingers, means for completing each handle including an imperforate part of the sunshield in that opening and a hinge for that imperforate part extending along an edge of that opening closest to a lateral edge of the sunshield, whereby the imperforate parts are manually bendable out of the openings toward lateral edges of the sunshield, and a poster-like message extending over a substantial portion of that sunshield and being publicly displayable in that window and also apart from any motor vehicle by a person holding up the sunshield at the mentioned handles.

From another related aspect thereof, the subject invention resides in an article of manufacture constituting both a hand-held poster and a specific sunshield for shading a motor vehicle inside a window thereof, comprising, in combination, a sunshield of a shading material corresponding in shape to the motor vehicle window, a poster-like message extending over a substantial portion of the sunshield, elongate openings extending along opposite lateral edges of the sunshield, with each of these openings having a height sufficient for an accommodation of four fingers of a human hand and being spaced from its adjacent lateral edge of the sunshield by a distance smaller than that height and manually twistable connections extending from each of the elongate openings to its adjacent lateral edge of the sunshield.

BRIEF DESCRIPTION OF THE DRAWINGS

The subject invention and its various objects and aspects will become more readily apparent from the following detailed description of preferred embodiments thereof, illustrated by way of example in the accompanying drawings, wherein like reference numerals designate like or equivalent parts, and in which.

DESCRIPTION OF PREFERRED EMBODIMENTS

Figure 1:
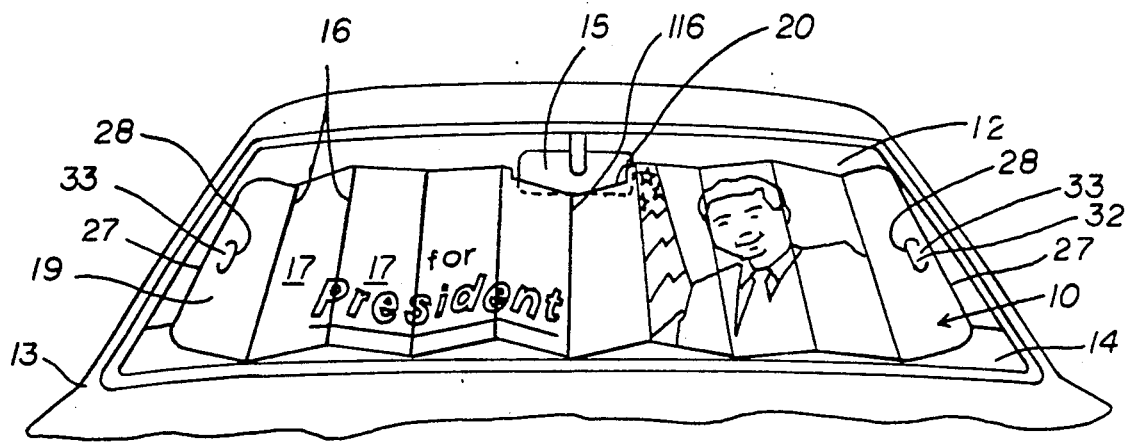
FIG. 1 is a perspective front view of part of a motor vehicle structure in combination with a combined foldable sunshield and manually stretchable poster prepared according to a preferred embodiment of the subject invention.

The combined poster and sunshield 10, according to the illustrated preferred embodiment of the invention, is shown in FIG. 1 positioned behind the windshield 12 of a motor vehicle or passenger automobile 13 having a dashboard 14 and a rearview mirror 15 behind the windshield.

For the basic sunshield structure, and for various modifications thereof not specifically shown in the drawings, reference may be had to my above mentioned earlier U.S. Pat. No. 4,202,396 issued to me, Abraham Levy, on May 13, 1980, for Motor vehicles and Sunshields, and herewith incorporated by reference herein.

The sunshield 10 has folds 16 herein simply referred to as "vertical folds," even though these folds need not be strictly vertical but may, for instance, fan out somewhat relative to a center fold line 116. The sunshield may be symmetrical relative to that typically vertical center fold line. The fold lines 16 and 116 divide the sunshield into a plurality of panels 17, which may be rectangular or substantially rectangular, and which are alternately biased clockwise and counterclockwise by the sunshield material at, and relative to, the illustrated fold lines. In this or any other manner, the combined sunshield and poster is made foldable accordion style. The panels 17 may, but need not necessarily be, of equal size or shape.

Figure 2:
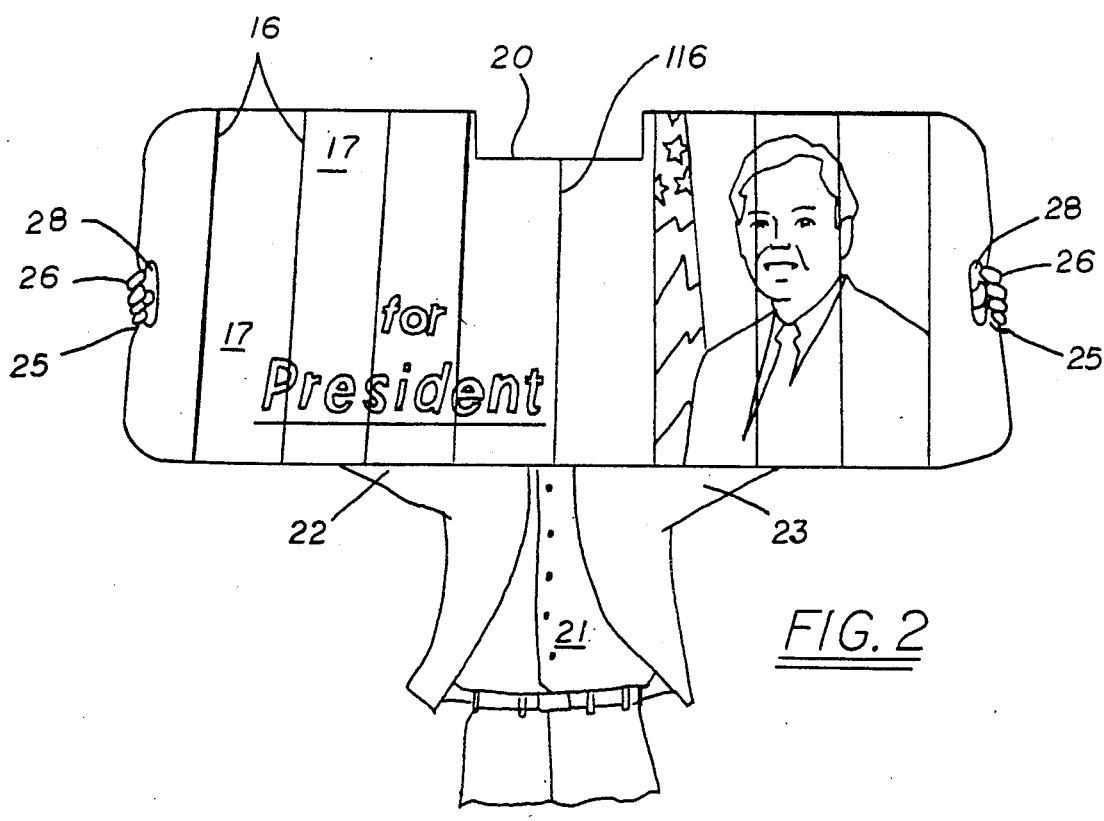
FIG. 2 is a front view of the combined sunshield and poster shown in FIG. 1, but stretched out and held up in the air by a person.

The sunshield may be sold, distributed and stored either flat or in a folded condition representing a substantially rectangular stack of the panels 17. Such stack may then be unfolded and positioned behind a window to be shaded, such as behind the windshield 12 as shown in FIG. 1, or may be manually stretched out and held up as a poster, such as shown in FIG. 2, for instance.

The sunshield 10 is made of corrugated cardboard or of another shading material 19 capable of standing up on the dashboard 14.

By way of example, the sunshield 10 has a cutout 20 which corresponds in location to the rearview mirror 15 of the motor vehicle 13 in terms of a positioning of the sunshield 10 in the window 12 on the dashboard 14, such as shown in FIG. 1. In particular, the cutout 20 is such that the rearview mirror 15 will hold the sunshield 10 against gravity.

However, while FIG. 1 and its description emphasize utility of the preferred embodiments in terms of windshields with inside rearview mirrors, the scope of the subject invention is not so limited, but may include an accommodation of other motor vehicle components at the inside of any window which is to be shaded by a sunshield. By way of example, the brake lights now present at rear windows in most modern cars may present an impediment to shading the rear window. In that case, the sunshield may be turned around, so that the cutout 20 is at the bottom in order to accommodate the brake light housing at the rear window.

During manufacture or afterward, a substantial portion of the sunshield 10 is provided with a poster-like message publicly displayable through a window, such as the windshield 12, and also publicly displayable outdoors by a person 21 holding up that sunshield with his or her right and left arms 22 and 23, respectively, such as shown by way of example in FIG. 2.

The subject invention is not partial as to the content of the message, as long as it is publicly displayable. Not everything that can be or has been printed onto sunshields falls into that category. For instance, neither a regular patent notice, nor a copyright notice, nor the manufacturer's or distributor's trademark or trade name, nor user's instructions are thought of as publicly displayable messages. Also, one would wisely refrain from any message that is illegal in the particular jurisdiction or tortious under the particular circumstances. However, apart from that, "anything that's fit to print" or display may serve as a publicly displayable message or, in other words, a poster-like message extending over a substantial portion of the sunshield; with "substantial portion" signifying a sufficient area of at least one side of the sunshield so as to serve as a placard or poster when held up in the air or otherwise publicly displayed by the user.

The subject invention thus provides a popular medium for constitutionally protected freedom of speech and expression, such as during Presidential Elections and in a large variety of other situations.

Handles of the type herein disclosed and equivalents thereof also enable a person to hold and swing the sunshield stretched out in the open, so as to attract attention from aircraft pilots or search and rescue teams, particularly in off-road emergencies.

Another utility of the subject invention is during sporting events, where fans are wont to display their preference for their favorite team. Such expressions may also be orchestrated so that people in different seats will be provided with sunshield/posters bearing different messages, expressions, or colors, whereby hundreds or thousands of spectators will participate in jointly displaying a message, or design or pattern extending over hundreds or thousands of sunshield/posters held up in the air. Also, once the principle of the subject invention has been understood, a wide and continually expanding variety of uses will come to mind. As will become apparent in the further course of this disclosure, the subject invention resides in a combination of structure and printed or otherwise applied matter.

In particular, the subject invention, in addition to making the sunshield foldable accordian style, makes that sunshield stretchable by at least one person for a public display of its poster-like message outdoors. As shown in the drawings, the invention to this end provides the sunshield 10 with lateral handles 25 by means of which the sunshield may be engaged and held up, such as by several fingers 26 of a human hand or, as in the case of FIG. 2, of each hand of the person 21, quite outside of the vehicle.

Figure 3:
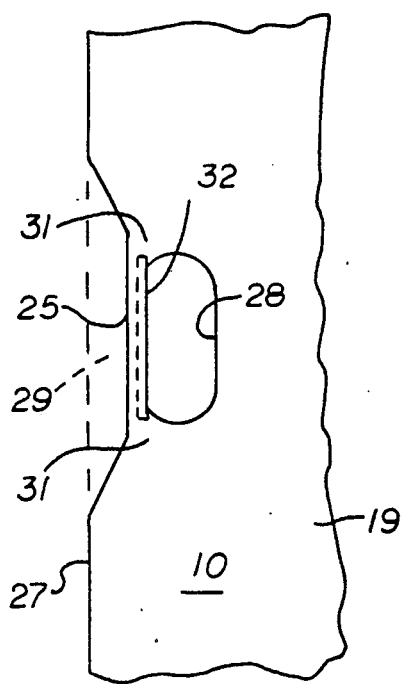
FIG. 3 is a fraction, on an enlarged scale, of the sunshield of FIGS. 1 and 2 manipulated pursuant to a preferred embodiment of the subject invention.
Figure 4:
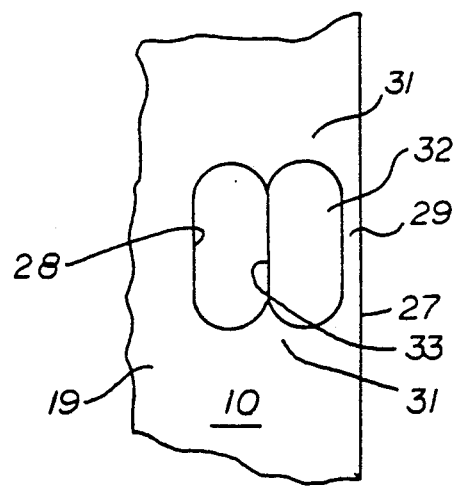
FIG. 4 is a rear detail view of a fraction, on an enlarged scale, of the sunshield shown in FIGS. 1 and 2.

According to the illustrated preferred embodiment of the invention, the handles 25 are provided by forming in the sunshield 10, adjacent each of two opposite lateral edges thereof, an elongate opening designated at 28 in FIGS. 3 and 4, and having, as shown, a height or length several times its width.

In FIG. 2, the person 21 is holding the sunshield/poster 10 on each side between the thumb and the four specific fingers of either hand. However, the practice of the subject invention is not so limited, but it is a significant feature of the illustrated embodiment that it provides people with a choice as to how they would want to hold up the sunshield/poster for greatest effect and convenience. Indeed, while the manner of holding up the poster/sunshield as shown in FIG. 2 may be most convenient for smaller and medium sized persons, other persons with a wider arm span or a different anatomy may prefer to put the four fingers of either hand right through the opening 28, thereby in effect applying stress to the held-up sunshield/poster with the upper backs of their hands. The thumb of each hand may then be used to stabilize the held up sunshield/poster.

Each elongate opening 28 is spaced from its adjacent lateral edge 27 of the sunshield by a distance smaller than the length or height of that elongate opening, to enable convenient twisting of the sunshield material, such as at 31, and manual retention of the sunshield. For strength and ease of retention of the handle, the distance by which the opening 28 is spaced from its adjacent lateral edge preferably is no longer than the width of that lateral opening. In this or any other manner, an elongate strip of the shading material extends along each elongate opening 28 and extends also along the one of the two lateral edges 27 adjacent that elongate opening. A strip of the shading material 19 thus extends between each elongate opening 28 and an adjacent lateral edge 27 of the sunshield 10.

In FIG. 3, that lateral strip of material is shown in dotted outline at 29, but is solidly shown at 29 in FIG. 4, prior to its distortion solidly illustrated in FIGS. 2 and 3, which show formation of a handle 25 maintainable between the thumb and four fingers 26 of a human hand by twisting the strip of shading material 29. That strip may be twisted adjacent opposite ends of the elongate opening 28 having a height several times its width. A manual facility of twisting the strip 29 is substantially aided by the elongate configuration of the opening 28 extending preferably in parallel or substantially parallel to the lateral sunshield edge 27.

At each end of the strip 29, the sunshield/poster 10 or shading material 19 thus has a manually twistable connection 31 of that strip to a remainder of the sunshield/poster or shading material.

Alternatively or additionally, the handles may be formed by bending material 32 of the sunshield/poster 10 out of the openings 28. At each of these openings, a hinge 33 for the part of material 32 may extend along an elongate edge of that opening and may be constituted by a flexible portion of the shading material 19.

According to the illustrated preferred embodiment of the invention, there thus is a first strip 29 of the shading material 19 between each of the elongate openings 28 and an adjacent one of the lateral edges 27, and a second strip 32 of that shading material in each of these openings 28, as well as at each of such openings a hinge 33 for that second strip 32 extending along an elongate edge of that opening.

A handle maintainable between the thumb and four fingers 26 of the human hand may then be formed by twisting the first and second strips 29 and 32 into mutual coverage, such as seen in FIG. 4, or by further twisting about the twistable connections 31 into the handles 25 shown in FIGS. 2 and 3.

These are the best modes for carrying out and using my invention to best advantage. However, given the extent to which my original patent has been infringed and my original sunshield has been imitated, despite widespread licensing at reasonable terms, I am reluctant to exclude anything that is within the scope of my invention. Thus, while I prefer an elongate opening for forming the handle, that opening 28 could, for instance, be square or trapezoidal, if the other relevant conditions herein disclosed are met. Even the elongate opening 28 could extend at some angle to the edge 27 of the sunshield, even though I call the largest extent of such opening its "height," and even though I prefer that height to extend at least roughly parallel to the shield edge 27 for most advantageous handling.

Also, even though I greatly prefer the handles to be made from the sunshield as disclosed with reference to the drawings, they could in principle be made partially or completely ouf of a plastic or other material and could be attached to the sunshield proper.

Articles of manufacture made according to the subject invention are superior in value, utility and quality to sunshields or posters made by other known methods. For instance, the sunshield/poster pursuant to the subject invention can be made or sold with a poster like message for a specific campaign, event or other occasion and can then also be used as a sunshield. In fact, as FIGS. 1 and 2 show, the particular message is not only conveyed when the sunshield/poster is held up demonstratively as in FIG. 2, but such message persists in plain view of the public when the sunshield/poster is used as a sunshield in automobiles, such as in FIG. 1.

The well-known writer Marshall McLuhan first pointed out that, "The message is in the medium." The subject invention expands that principle by providing a medium with a message that not only is demonstratively displayable to the public by being effectively and conveniently held up to them, but that persists in its continuous message when placed in windshields of parked cars all over the country, if not throughout Marshall McLuhan's "Global village." Accordingly, where the message is in the medium, we definitely have here in effect a new message.

This concept may, of course, be expanded within the scope of the subject invention, inasmuch as the subject extensive disclosure will render apparent or suggest to those skilled in the art various modifications and variations within the spirit and scope of the invention or equivalents thereof.

I claim:

1. In a method of making a sunshield for shading a motor vehicle inside a window thereof, the improvement comprising, in combination, the steps of:

providing a substantial portion of said sunshield with a poster-like message publicly displaying through said windown and also publicly displayable apart from any motor vehicle by a person holding up said sunshield;

making said sunshield foldable accordion style; and making said sunshield stretchable by said person for a public display of said message apart from any motor vehicle by providing said sunshield with lateral handles for manual engagement by several fingers of each hand of said person, said handles being provided by:

forming in said sunshield adjacent each of two lateral edges thereof an opening of sufficient size to accommodate said several fingers;

leaving imperforate parts of said sunshield in the elongate openings; and bending said imperforate parts out of the openings without diminution in size toward the next-adjacent one of said two lateral edges at each opening.

2. A method as claimed in claim 1, including the step of:

providing each opening with a height several times its width.

3. A method as claimed in claim 1, including the steps of:

said openings as elongate openings each having a height several times its width; and providing at each elongate opening an elongate strip of material extending along that elongate opening.

4. A method as claimed in claim 3, including the step of:

said imperforate parts of said sunshield into coincidence with said strip of material at each opening.

5. A method as claimed in claim 1, including the steps of:

said openings as elongate openings each having a height several times its width; and providing at each elongate opening an elongate strip of material extending along that elongate opening and extending along the one of said two lateral edges adjacent that elongate opening.

6. A method as claimed in claim 1, including the steps of:

said openings as elongate openings having a predetermined height; and leaving between each opening and the adjacent one of said two lateral edges a strip of material of said sunshield smaller in width than said height of the opening.

7. A method as claimed in claim 1, including the step of:

providing each opening with a height several times its width;

leaving between each elongate opening and the adjacent one of said two lateral edges a first strip of material of said sunshield smaller in width than said height of the elongate opening;

leaving in each opening a second strip of material of said sunshield; and bending the second strips of material out of each elongate opening for a completion of said handles.

8. A method as claimed in claim 1, including the steps of:

said openings as elongate openings each having a height several times its width;

leaving between each elongate opening and the adjacent one of said two lateral edges a strip of material of said sunshield smaller in width than said height of the elongate opening; and forming a handle maintainable between the thumb and four fingers of a human hand by twisting said strip adjacent opposite ends of said elongate opening from said elongate opening to the adjacent one of said two lateral edges.

9. A method as claimed in claim 1, including the steps of:

providing each opening with a height several times its width;

leaving between each elongate opening and the adjacent one of said two lateral edges a first strip of material of said sunshield smaller in width than said height of the elongate opening;

leaving in each opening a second strip of material of said sunshield; and forming a handle maintainable between the thumb and four fingers of the human hand by twisting said first and second strips into mutual coverage.

10. A method as claimed in claim 1, including the steps of:

providing manually twistable connections extending from each of said elongate openings to the next-adjacent one of said two lateral edges of the sunshield.

11. A method as claimed in claim 10, including the steps of:

manually twisting said connections in forming said handles.

12. An article of manufacture constituting both a hand-held poster and specific sunshield for shading a motor vehicle inside a window therof, comprising in combination:

a sunshield of a shading material folded accordion style and expandable to correspond in shape to said windown and having lateral handles each dimensioned for manual engagement by several fingers of a person's hand;

each of said handles having an opening of sufficient size to accommodate said fingers;

means for completing each handle including an imperforate part of said sunshield in that opening and a hinge for that imperforate part extending along an edge of that opening closest to a lateral edge of said sunshield, whereby the imperforate parts are manually bendable out of the openings toward lateral edges of the sunshield; and a poster-like message extending over a substantial portion of said sunshield and being publicly displayable in said window and also apart form any motor vehicle by a person holding up said sunshield at said handle.

13. An article as claimed in claim 12, wherein:
each opening has a height several times its width.

14. An article as claimed in claim 12, wherein:
each opening has a height several times its width; and
at each elongate opening an elongate strip of said shading material extends along that elongate opening.

15. An article as claimed in claim 12, wherein:
each opening has a height several times its width; and
at each elongate opening an elongate strip of said shading material extends along that elongate opening and along an adjacent lateral edge of said sunshield.

16. An article as claimed in claim 12, wherein:
each opening has a height several times its width; and
a strip of said shading material is between each elongate opening and an adjacent lateral edge of said sunshield.

17. An article as claimed in claim 12, wherein:
each opening has a predetermined height; and
a strip of shading material smaller in width than said predetermined height of the opening is between each opening and the next-adjacent lateral edge of the sunshield.

18. An article as claimed in claim 17, wherein:
said strip of shading material is no wider than a width of said opening having a predetermined height.

19. An article of manufacture constituting both a hand-held poster and a specific sunshield for shading a motor vehicle inside a window thereof, comprising in combination:

a sunshield of a shading material corresponding in shape to said window;

a poster-like message extending over a substantial portion of said sunshield;

elongate openings extending along opposite lateral edges of said sunshield;

each of said openings having a height sufficient for an accommodation of four fingers of a human hand and being spaced from its adjacent lateral edge of said sunshield by a distance smaller than said height and manually twistable connections extending from each of said elongate openings to its adjacent lateral edge of the sunshield.

20. An article as claimed in claim 19, including:
in each of said openings an imperforate part of said shading material of a size sufficient to fill each opening completely; and
at each of said openings a hinge for said imperforate part extending along an edge of that opening closest to a lateral edge of said sunshield.

21. An article as claimed in claim 19, including:
a strip of said shading material between each of said elongate openings and an adjacent one of said lateral edges of the sunshield;
manually twistable connections comprising connections of that strip to a remainder of said sunshield.

22. An article as claimed in claim 19, including:
a first strip of said shading material between each of said elongate openings and an adjacent one of said lateral edges;
said manually twistable connections including at each end of said first strip a manually twistable connection of that first strip to a remainder of said sunshield;
a second strip of said shading material in each of said openings; and
at each of said openings a hinge for said second strip extending along an elongate edge of that opening.

* * * * *

UNITED STATES PATENT AND TRADEMARK OFFICE
CERTIFICATE OF CORRECTION

PATENT NO. : 5,046,543

DATED : September 10, 1991

INVENTOR(S) : Abraham Levy

It is certified that error appears in the above-identified patent and that said Letters Patent is hereby corrected as shown below:

```
Column  4, line 19, change the period (.) to a colon (:);
Column  4, line 46, change "vehicles" to --Vehicles--;

Column  7, line 43, insert a hyphen (-) between "poster" and
                    "like";
Column  7, line 59, change "village" to --Village--;
Column  8, line  5, change "displaying" to --displayable--;
Column  8, line  6, change "windown" to --window--;
Column  8, line 31, before "said" insert --forming--;
Column  8, line 37, before "said", first occurrence, insert
                    --bending--;
Column  8, line 41, before "said" insert --forming--;
Column  8, line 49, before "said" insert --forming--;
Column  9, line  1, before "said" insert --forming--;
Column  9, line 41, change "windown" to --window--;
Column  9, line 55, change "form" to --from--;
Column  9, line 57, change "handle" to --handles--; and
Column 10, line 50, before "manually" insert --said--.
```

Signed and Sealed this

Seventeenth Day of November, 1992

*Attest:*

DOUGLAS B. COMER

*Attesting Officer*      *Acting Commissioner of Patents and Trademarks*